(12) United States Patent
Keller

(10) Patent No.: US 9,212,036 B2
(45) Date of Patent: Dec. 15, 2015

(54) INDUSTRIAL TRUCK

(71) Applicant: HUBTEX MASCHINENBAU GMBH & CO. KG, FULDA (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 0 days.

(21) Appl. No.: 14/373,035

(22) PCT Filed: Jan. 18, 2013

(86) PCT No.: PCT/EP2013/050879
§ 371 (c)(1),
(2) Date: Jul. 18, 2014

(87) PCT Pub. No.: WO2013/107836
PCT Pub. Date: Jul. 25, 2013

(65) Prior Publication Data
US 2015/0001007 A1   Jan. 1, 2015

(30) Foreign Application Priority Data

Jan. 20, 2012   (DE) .................... 20 2012 100 213 U

(51) Int. Cl.
*B60G 1/04*    (2006.01)
*B66F 9/075*   (2006.01)
*B60G 21/05*   (2006.01)
*B60G 21/073*  (2006.01)

(52) U.S. Cl.
CPC ............ *B66F 9/07586* (2013.01); *B60G 21/05* (2013.01); *B60G 21/073* (2013.01); *B60G 2300/022* (2013.01)

(58) Field of Classification Search
USPC ............ 280/5.508, 6.154, 124.111, 124.112, 280/124.125, 124.134, 124.157, 124.158
See application file for complete search history.

(56) References Cited

U.S. PATENT DOCUMENTS

| | | | | |
|---|---|---|---|---|
| 3,397,895 | A * | 8/1968 | Kuniskis | 280/124.107 |
| 3,439,927 | A | 4/1969 | Ryskamp | |
| 5,230,529 | A * | 7/1993 | Harvey-Bailey | 280/5.508 |
| 5,772,224 | A * | 6/1998 | Tong | 280/5.509 |
| 6,059,276 | A * | 5/2000 | Dutzi et al. | 267/150 |
| 7,861,820 | B1 * | 1/2011 | Goodwin et al. | 180/411 |
| 8,128,110 | B2 * | 3/2012 | Sacli | 280/124.106 |
| 8,678,405 | B2 * | 3/2014 | Tashiro | 280/89.12 |
| 2003/0070862 | A1 * | 4/2003 | Tartara | 180/411 |
| 2003/0090080 | A1 * | 5/2003 | Trotter et al. | 280/124.157 |
| 2004/0227395 | A1 * | 11/2004 | Katae | 301/124.1 |
| 2006/0027990 | A1 | 2/2006 | Dobson et al. | |
| 2007/0199748 | A1 * | 8/2007 | Ross et al. | 180/65.5 |
| 2010/0237578 | A1 * | 9/2010 | Hakoda et al. | 280/124.116 |

FOREIGN PATENT DOCUMENTS

| | | |
|---|---|---|
| DE | 000 M 22155 MAZ | 4/1956 |
| DE | 1 278 941 B | 9/1968 |
| DE | 3 227 398 A1 | 1/1984 |
| DE | 29 716 301 U1 | 11/1997 |
| GB | 425 092 A | 3/1935 |
| JP | 2005-53335 A | 3/2005 |

* cited by examiner

*Primary Examiner* — Toan To
(74) *Attorney, Agent, or Firm* — Norman B. Thot

(57) ABSTRACT

An industrial truck includes a chassis comprising a plurality of wheels, and wheel suspensions. Each wheel suspension is mounted on the chassis around two axes so as to be tiltable. At least two wheels of the plurality of wheels are each mounted on the chassis via a respective wheel suspension.

14 Claims, 5 Drawing Sheets

INDUSTRIAL TRUCK

CROSS REFERENCE TO PRIOR APPLICATIONS

This application is a U.S. National Phase application under 35 U.S.C. §371 of International Application No. PCT/EP2013/050879, filed on Jan. 18, 2013 and which claims benefit to German Patent Application No. 20 2012 100 213.2, filed on Jan. 20, 2012. The International Application was published in German on Jul. 25, 2013 as WO 2013/107836 A1 under PCT Article 21(2).

FIELD

The present invention relates to an industrial truck, for example, a forklift truck.

BACKGROUND

A conflict exists in industrial trucks between providing the greatest possible stability and adaptability to uneven surfaces. Industrial trucks are also intended to be as stable as possible even in the case of high lift heights. It is also necessary for its chassis to be able to adapt to uneven surfaces.

Four-wheeled industrial trucks have previously been described in which the two rear wheels are connected by an oscillating rigid axle which is connected at a point (rotary bearing) to the industrial truck and/or the chassis of the industrial truck. Similar to a three-wheeled industrial truck, this results in a three-point support and static redundancy so that problems with uneven surfaces are avoided. A drawback is that it has a greater tendency to tip over than an industrial truck with a four-point support because the center of gravity is located closer to the lateral tilting edges. These lateral tilting edges extend through the load wheels and meet in the bearing point of the oscillating rigid axle.

Industrial trucks with an oscillating frame have also previously been described. A drawback of this oscillating frame is that it is cost-intensive and requires more constructional space due to its rear frame extensions. It is also complex to construct from a technical perspective in terms of strength.

Industrial trucks with a hydraulic compensation of the level of the load wheels have also previously been described. A drawback thereof is that the hydraulic compensation only functions on good surfaces, i.e., on relatively even surfaces. If uneven surfaces exist, too much oil must flow to and fro through relatively small cross sections between the cylinders. This results in distortion and fractures in the frame.

SUMMARY

An aspect of the present invention is to provide an industrial truck, for example, a forklift truck, which is improved relative to at least one of the aforementioned drawbacks.

In an embodiment, the present invention provides an industrial truck which includes a chassis comprising a plurality of wheels, and wheel suspensions. Each wheel suspension is mounted on the chassis around two axes so as to be tiltable. At least two wheels of the plurality of wheels are each mounted on the chassis via a respective wheel suspension.

BRIEF DESCRIPTION OF THE DRAWINGS

The present invention is described in greater detail below on the basis of embodiments and of the drawings in which.

DETAILED DESCRIPTION

Figure 1:
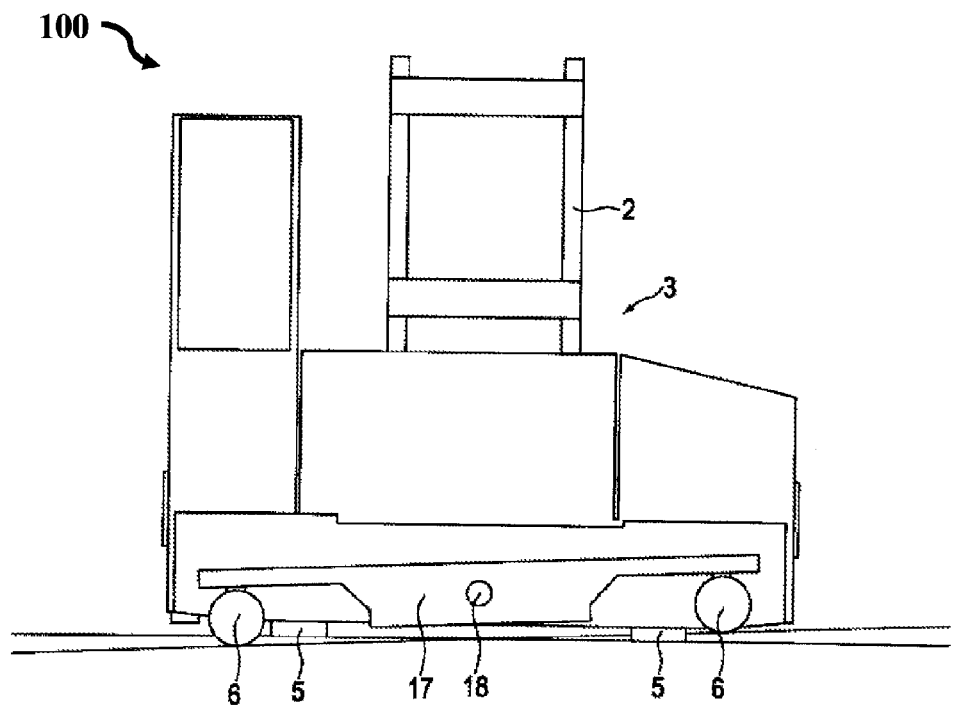
FIG. 1 shows a schematic rear view of a forklift truck described in the prior art in which the rear wheels are connected by an oscillating rigid axle.

The industrial truck according to the present invention, for example, a forklift truck, comprises a chassis and wheels. At least two wheels are mounted on the chassis by means of two wheel suspensions. The wheel suspensions are mounted on the chassis around two axes in a tiltable manner. Each wheel suspension is thus mounted on the chassis around just one axis in a tiltable manner.

Each wheel suspension can, for example, mount just one wheel on the chassis.

Two wheels can, for example, be mounted on the chassis by means of such wheel suspensions.

The wheels may be multiple wheels, for example, twin wheels. In the case of twin wheels, therefore, four individual wheels are mounted.

The industrial truck can, for example, comprise four wheels, for example, where two of the four wheels are arranged in the vicinity of the load-bearing device, i.e., also denoted as load wheels. Two further wheels can be arranged so as to be further removed from the load-bearing device, i.e., as rear wheels. All wheels may be multiple wheels.

The rear wheels can, for example, be mounted on the chassis by means of such wheel suspensions.

The industrial truck can, for example, comprise a load-bearing device, for example, a load-bearing fork.

The term "chassis" herein denotes the vehicle frame and, also in a further use of this term, in a self-supporting body without a vehicle frame, the self-supporting body.

The axes can, for example, be spaced apart from one another and, for example, extend parallel to one another. The axes can, for example, not be aligned.

The axes can, for example, extend parallel to the direction of travel in which the industrial truck moves precisely in the direction of its load-bearing device.

The tiltable mounting of the wheel suspensions about two axes can, for example, be implemented by rotary bearings.

The wheel suspensions can, for example, comprise rigid rockers. Rigid rockers can, for example, be provided, the rigid rockers being tiltably mounted on the chassis around the axes. "Rigid elements" herein denotes those elements which are not intentionally designed for deformation such as torsion, deflection, or the like. As a result, robust durable wheel suspensions may be achieved at a relatively low production cost. In an embodiment, the wheel suspensions exclusively consist of rigid elements.

In an embodiment, the two wheel suspensions can, for example, be coupled together, for example, mechanically, and, for example, fulfill their load-bearing function only via this coupling. In other words, a motion coupling of the two wheel suspensions is therefore, for example, present and this can, for example, be a prerequisite for the load-bearing function of the wheel suspensions.

The motion coupling can, for example, take place so that an upward movement of a wheel forces a downward movement of the other wheel and vice versa.

The mechanical coupling can, for example, take place by means of a coupling rod which can, for example, be connected to the wheel suspensions in an articulated manner.

The coupling rod can, for example, be arranged in each case by means of a joint (which can, for example, be arranged at one respective end of the coupling rod) on the rockers (for example, at the ends thereof facing one another). The coupling rod can, for example, extend transversely to the direction of travel in which the industrial truck moves precisely in the direction of its load-bearing device.

The coupling rod can, for example, be longitudinally adjustable. It can, for example, be designed so that it may be longitudinally adjusted by the driver of the industrial truck during travel. By means of the longitudinally adjustable coupling rod, it is achieved that the industrial truck may be inclined in a simple manner about an axis, for example, its transverse axis (pitching).

If the coupling rod comprises a hydraulic cylinder, it may then be designed to be longitudinally adjustable in a particularly robust and convenient manner.

In an embodiment, a pressure accumulator can, for example, be provided, for example, on the hydraulic cylinder. The volumetric flow which is present in the hydraulic circuit may thereby be increased and/or a smaller pump may be used.

In an embodiment, the coupling rod comprises a damping element and/or a spring element. The vehicle in this embodiment can, for example, also be unsprung. "Unsprung" here refers to the fact that the vehicle has no axle suspension and/or wheel suspension. The driving comfort of the industrial truck may be enhanced by means of the damping element and/or spring element.

In an embodiment, the hydraulic cylinder is connected to a damping element and/or spring element.

In an embodiment, the industrial truck is entirely unsprung.

The spacing of the axes from one another can, for example, be smaller than the spacing of the two wheels mounted by means of such wheel suspensions from one another.

The rockers can, for example, have an angled portion with a kink in the region of the axes. The angle of this kink can, for example, be between 115° and 155°, for example, approximately 135°.

It is also conceivable, however, that the spacing of the axes from one another is greater than the spacing from one another of the two wheels mounted by means of the wheel suspensions. The stability may be further increased as a result.

All of the wheels may be pivoted by 90°, i.e., the embodiment as a forklift truck is a four-way stacker. In an embodiment, all of the wheels are pivotable in any direction, i.e., the embodiment as a forklift truck is a multi-directional stacker.

The present invention also comprises a wheel suspension having the aforementioned features.

The present invention will hereinafter be described in more detail under reference to exemplary embodiments shown in the drawings.

FIG. 1 shows a forklift truck 100 known from the prior art. Said forklift truck 100 has a load-bearing device 2 with a load-bearing fork 3 which, as also in FIGS. 2 to 8, is concealed by the remainder of the forklift truck 100 and thus not shown. Two load wheels 5 in the vicinity of the load-bearing device 2 and two rear wheels 6 are provided. The rear wheels 6 are arranged on an oscillating rigid axle 17 which is pivotably connected on a single bearing 18 to the remainder of the forklift truck 100.

Figure 2:
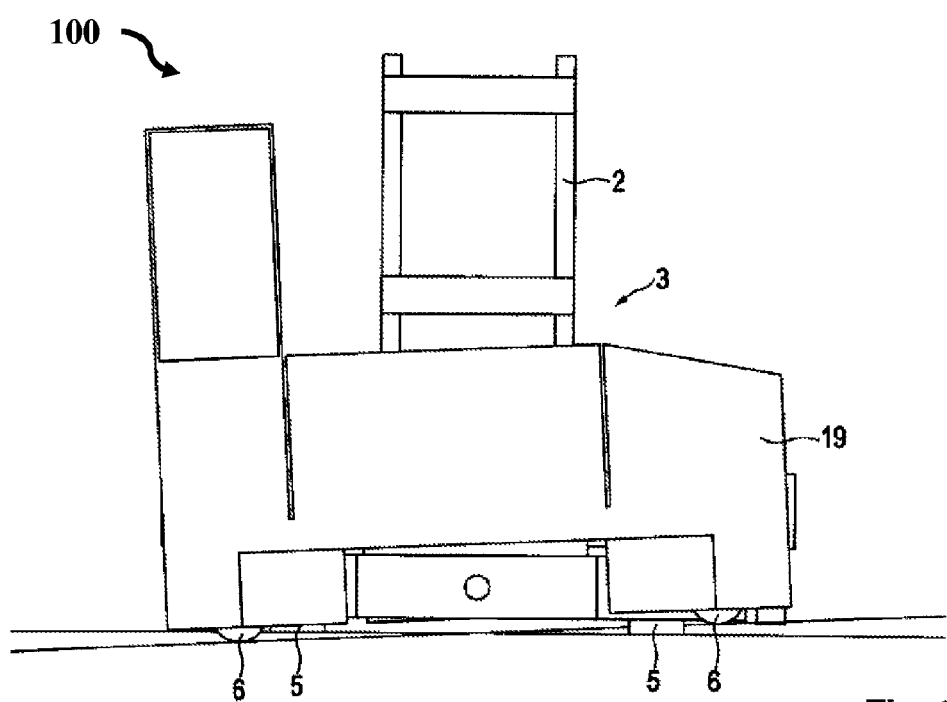
FIG. 2 shows a schematic rear view of a forklift truck with an oscillating frame described in the prior art.

The forklift truck 100 shown in FIG. 2 and also known from the prior art has an oscillating frame 19 instead of the oscillating rigid axle 17.

Figure 3:
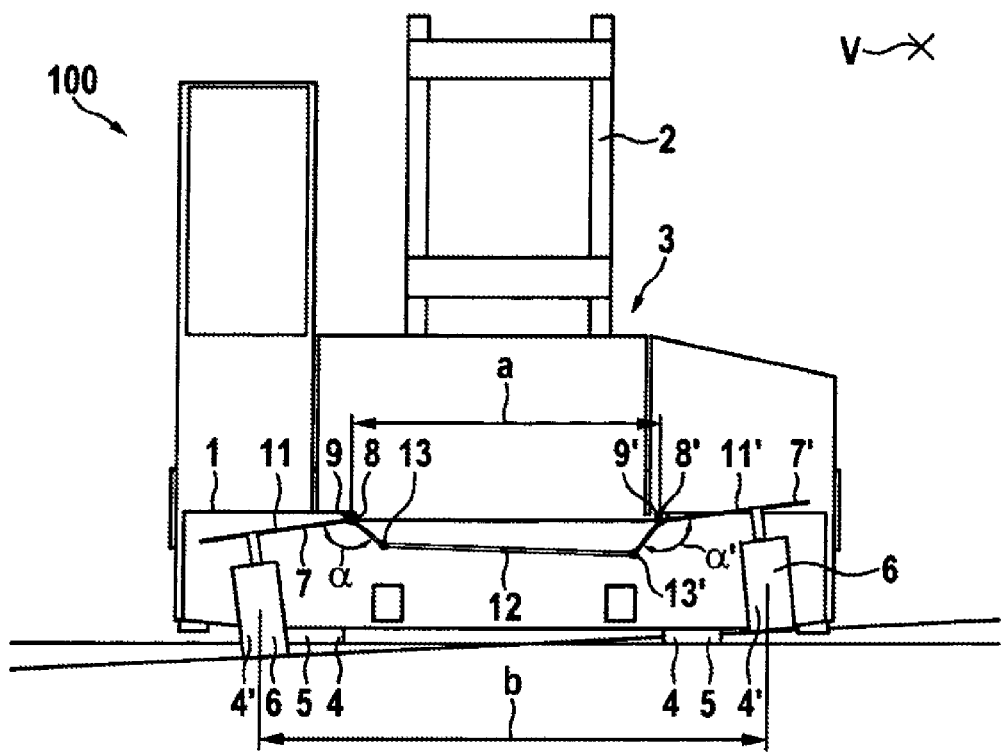
FIG. 3 shows a partially transparent schematic rear view of an embodiment of a forklift truck according to the present invention.

FIG. 3 shows a first exemplary embodiment of an industrial truck 100 according to the present invention which is a forklift truck in the drawings shown, said forklift truck having a motorized drive and being provided for internal goods handling and transport. The forklift truck has a load-bearing device 2 and a load-bearing fork 3 concealed by the remainder of the forklift truck in the figure. Two load wheels 5 are arranged in the vicinity of the load-bearing device 2. Two rear wheels 6 are arranged further removed from the load-bearing device 2. In other words, the rear wheels 6 are arranged opposite the load wheels 5. All four wheels 4, 4' may be steered in any direction, the forklift truck 100 is thus a multi-directional stacker. The industrial truck 100 has a frame, i.e., it does not have a self-supporting body.

The two rear wheels 6 are mounted by means of two wheel suspensions 7, 7' on the chassis 1. The wheel suspensions 7, 7' are pivotably and/or tiltably mounted on the chassis 1 around axes 9, 9' by means of two rotary bearings 8, 8'. The axes 9, 9' extend in FIGS. 3 to 8 perpendicular to the drawing plane and are therefore only visible as dots. The rotary bearings 8, 8' are remote from one another and the axes 9, 9' extend parallel to one another and are spaced apart from one another.

In FIGS. 3 to 8, the direction of travel of the forklift truck, in which the forklift truck moves precisely in the direction of its load-bearing device, is symbolized by the cross V. This direction extends perpendicular to the drawing plane and away from the observer. The axes 9, 9' of the rotary bearings 8, 8' extend parallel to this direction of travel V.

The two wheel suspensions 7, 7' have similar rigid rockers 11, 11'. At the ends of the rockers 11, 11' facing one another, said rockers 11, 11' are connected by means of two joints 13, 13' by a coupling rod 12. The rockers 11, 11' and the coupling rod 12 are in this case rigid elements which are not intentionally designed for torsion, deflection or the like. The rockers 11, 11' in the exemplary embodiments shown in FIGS. 3 to 8, in which the spacing b of the rear wheels is greater than the spacing a of the axes 9 from one another, have an angled portion with a kink in the region of the rotary bearings 8, 8'. The angle α, α' of this kink is approximately 135°. If passing over an uneven surface causes the lifting of a rear wheel 6, this upward movement results in a tensile force being introduced via the coupling rod 12 into the end of the opposing rocker facing this wheel. This effects a downward movement of the other rear wheel 6 (in this regard similar to the oscillating rigid axle). In the rockers 11, 11' of the exemplary embodiments shown in FIGS. 3 to 8, the rotary bearing 8, 8' is arranged between the ends of the rockers, the rockers 11, 11' are thus not mounted at the end of the frame 1 but in a region arranged between its ends. The industrial truck 100 shown in FIG. 3 is unsprung.

Figure 4:
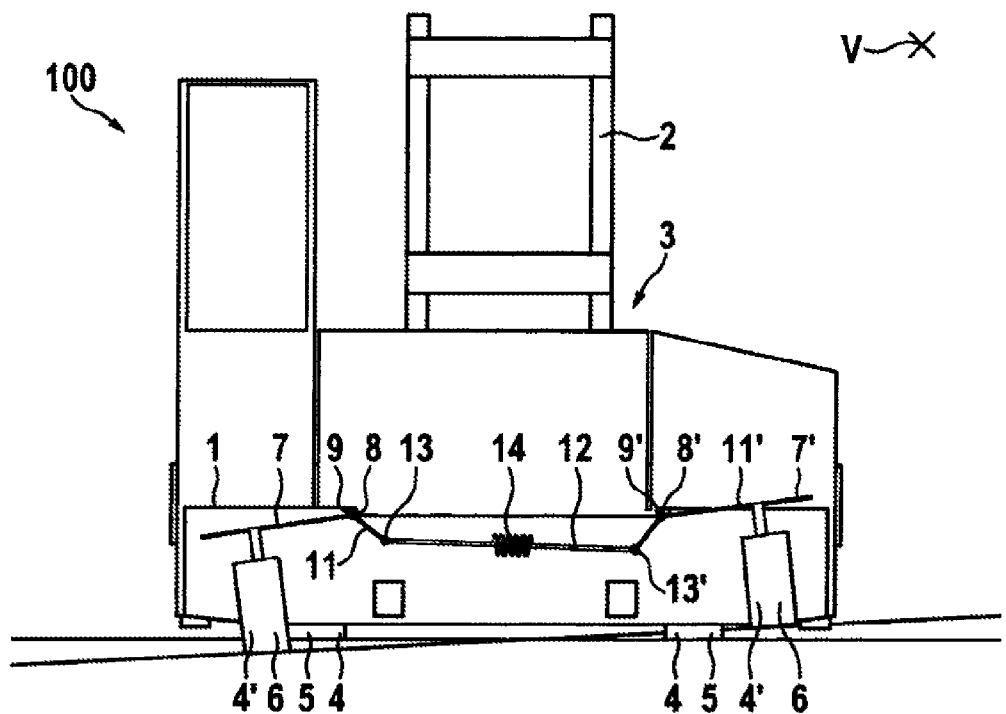
FIG. 4 shows a partially transparent schematic rear view of an embodiment of a forklift truck according to the present invention with a damping element and/or spring element.

In the exemplary embodiment shown in FIG. 4, the coupling rod 12 has a damping element and/or spring element 14. This results in the suspension of the chassis.

Figure 5:
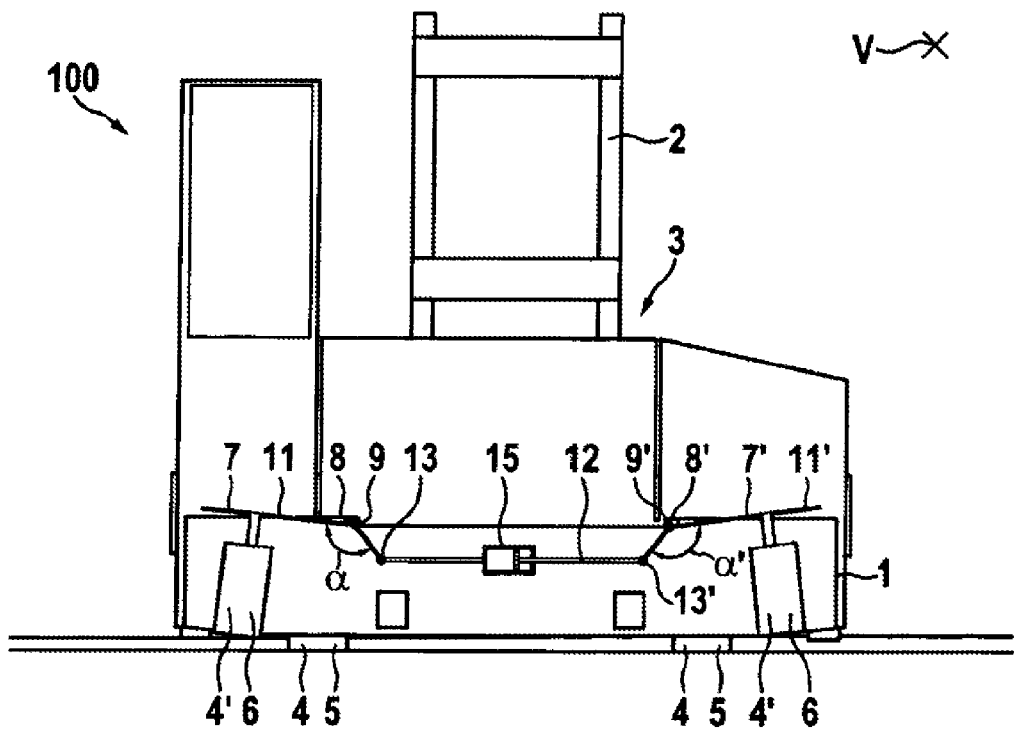
FIG. 5 shows a partially transparent schematic rear view of an embodiment of a forklift truck according to the present invention with a hydraulic cylinder.
Figure 6:
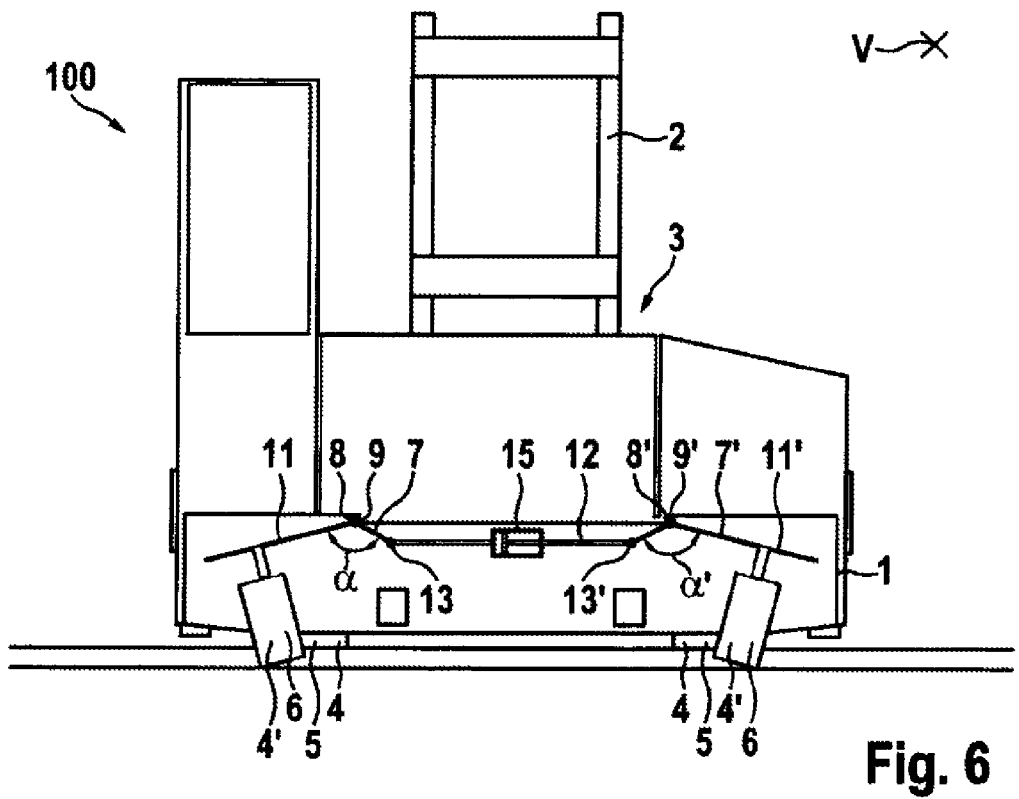
FIG. 6 shows a view as in FIG. 5 with the coupling rod longitudinally adjusted relative to FIG. 5.

In the exemplary embodiment shown in FIG. 5, the coupling rod 12 has a hydraulic cylinder 15. The coupling rod 12 is longitudinally adjustable as a result. As a comparison of FIGS. 5 and 6 shows the wheel suspensions 7, 7' effect an inclination of the industrial truck 100 (chassis and/or frame inclination 1). The inclination in this case corresponds to an inclination about an axis oriented transversely to the direction of travel V, in which the industrial truck 100 moves precisely in the direction of its load-bearing device, i.e., pitching in this direction of travel, wherein the axis is able to extend through the contact points of the load wheels 5 and/or the axes of the load wheels 5. FIGS. 5 and 6 may also be interpreted as passing over an undulating surface. In FIG. 5, the load wheels 5 are in the trough of the undulating surface and the rear wheels 6 are on the crest of the undulating surface and vice versa in FIG. 6. Compensation for this undulating surface may be achieved by the longitudinal adjustment of the coupling rod 12. The chassis 1 is able to maintain a specific position, namely a horizontal position, when passing over the undulating surface. The longitudinal adjustment of the coupling rod 12 is able to take place automatically.

Figure 7:
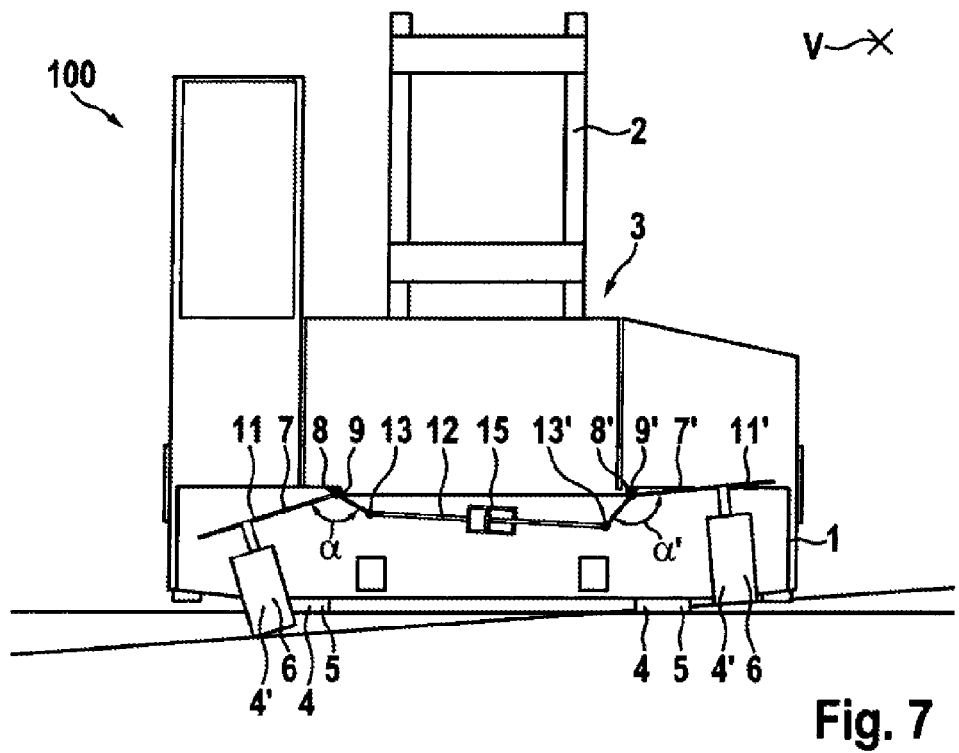
FIG. 7 shows a view similar to FIG. 5 with wheel suspensions adapted to an inclined surface.

FIG. 7 shows the reactions of the wheel suspensions 7, 7' on an uneven surface, which constitutes a combination of an inclined surface and an undulating surface. The rear wheels 6 are located on a level which as a whole is deeper and inclined compared to the load wheels 5.

Figure 8:
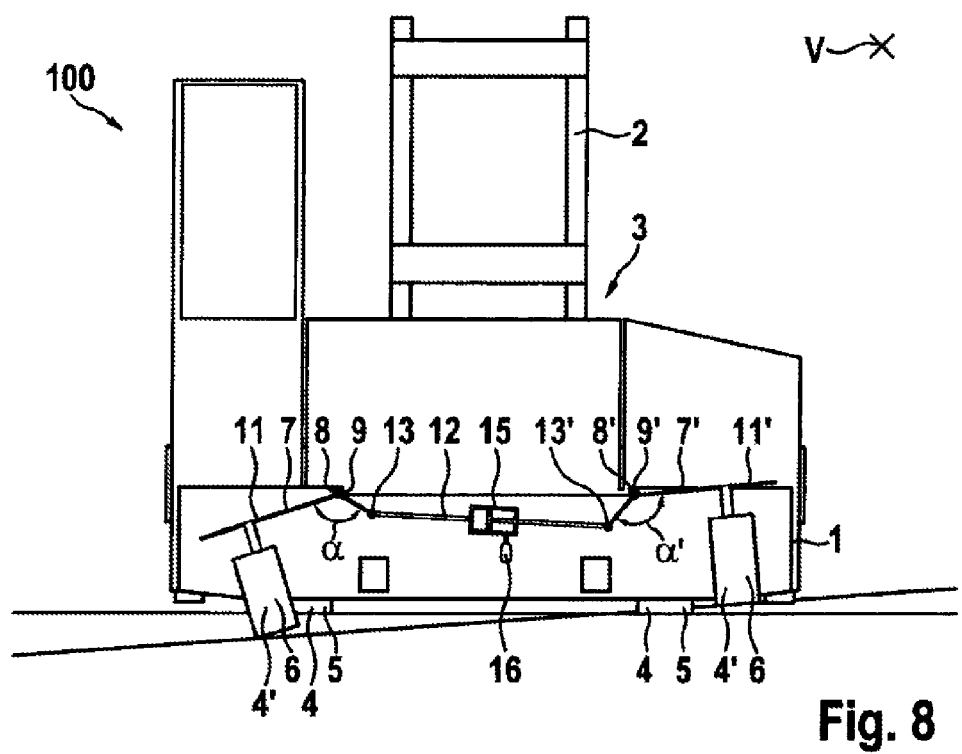
FIG. 8 shows a view as in FIG. 7 with a pressure accumulator.

FIG. 8 shows by way of example an integration of a pressure accumulator 16 in the hydraulic circuit of the hydraulic cylinder 15.

Figure 9:
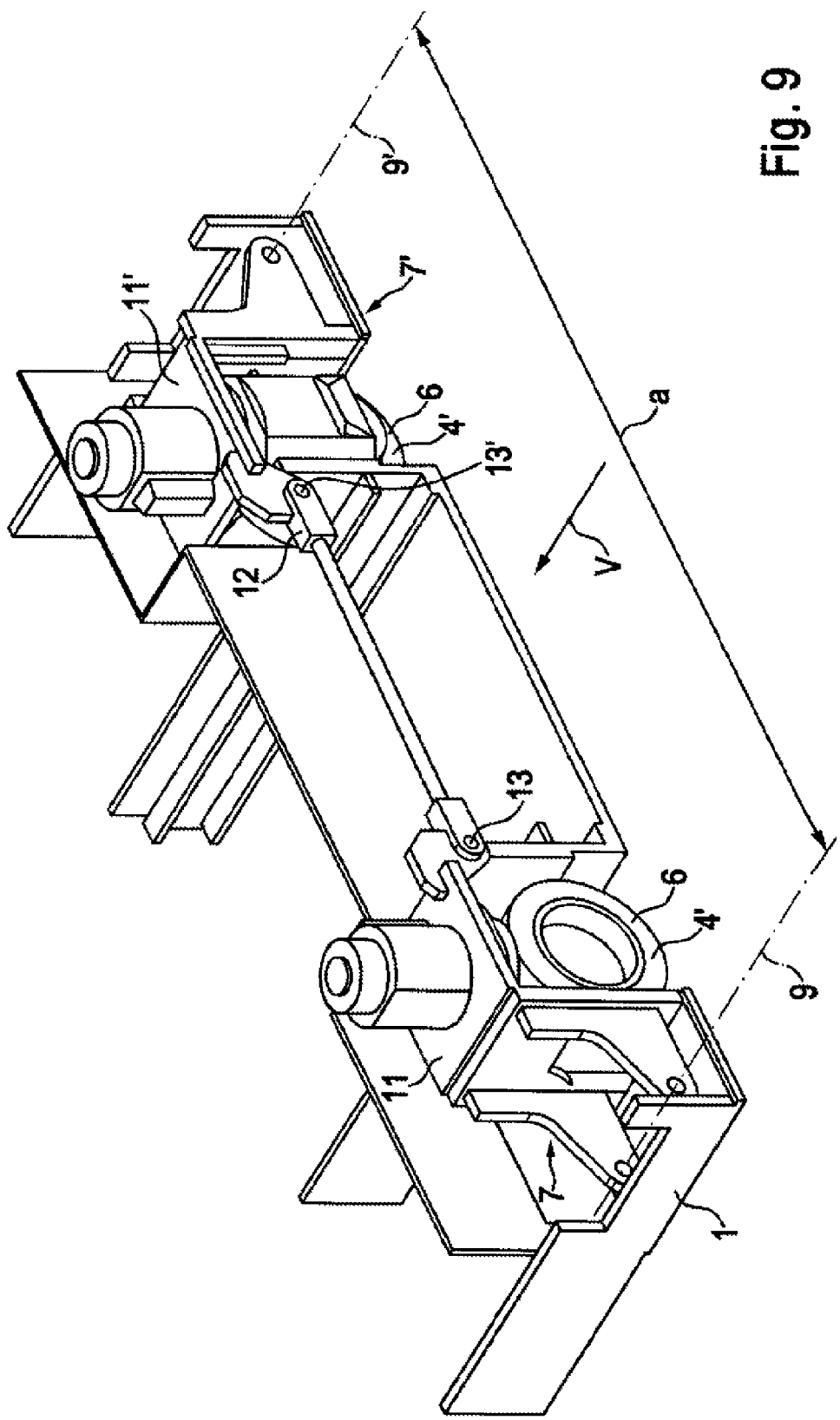
FIG. 9 shows a perspective view of a detail of an embodiment of a forklift truck according to the present invention in which the spacing of the axes of the rotary bearings from one another is greater than the spacing of the rear wheels from one another.

FIG. 9 shows an exemplary embodiment in which the rotary bearings 8, 8' are arranged such that the axes 9, 9' have the greatest possible spacing a from one another. In this case, the rockers 11, 11' are respectively mounted on the frame 1 at the ends, with their ends facing away from one another, by means of the rotary bearings 8, 8' (not shown in FIG. 9). In the exemplary embodiment shown in FIG. 9, the spacing a of the axes 9, 9' from one another is greater than the spacing b of the rear wheels 6 from one another, which is different from the exemplary embodiments shown in FIGS. 3 to 8. This may result in a particularly high degree of stability.

The industrial truck 100 according to the present invention shown with at least two wheels 4' thus has no individual wheel suspension. The wheel suspensions 7, 7' of these two wheels 4' is also not an oscillating axle-type suspension of these wheels on a rigid axle, in which the oscillating axle is merely arranged on the chassis via a single rotary bearing.

The advantage of the arrangement according to the present invention shown, is a very simple frame construction and the rapid compensation of uneven surfaces (as in the case of the "ideal" oscillating frame) and good stability.

All the embodiments according to the shown present invention provide for an interdependent vertical movement of the two rear wheels 6, 6' in contrast to, for example, an individual wheel suspension. After passing over the uneven surface, the downwardly moved rear wheel 6 effects the restoring force for the upwardly moved rear wheel 6. The coupled wheel suspensions 7, 7' effect a compensation of the surface and/or a compensation of the level of the surface.

As in the case of an oscillating rigid axle, mechanical redundancy is avoided in all exemplary embodiments of the shown present invention. In contrast to an oscillating rigid axle, however, invention a three-point support is not present in the industrial truck 100 according to the present, but rather a four-point support. The tilting axes extend in each case through a load wheel 5 and a rotary bearing 8, 8'. Stability is thus increased.

The present invention is not limited to embodiments described herein; reference should be had to the appended claims.

LIST OF REFERENCE NUMERALS

100 Industrial truck/Forklift Truck
1 Frame and/or chassis
2 Load-bearing device
3 Load-bearing fork
4, 4' Wheels
5 Load wheels
6 Rear wheels
7, 7' Wheel suspension
8, 8' Rotary bearings
9, 9' Axes
10 Left blank
11, 11' Rockers
12 Coupling rod
13, 13' Joint
14 Damping element and/or spring element
15 Hydraulic cylinder
16 Pressure accumulator
17 Oscillating rigid axle
18 Single bearing
19 Oscillating frame
V Direction of travel in which the industrial truck moves precisely in the direction of its load-bearing device
a, b Spacing
α, α' Angle

What is claimed is:

1. An industrial truck comprising:
a chassis comprising a plurality of wheels; and
wheel suspensions, each wheel suspension being mounted on the chassis around two axes so as to be tiltable,
wherein,
at least two wheels of the plurality of wheels are each mounted on the chassis via a respective wheel suspension, and
the wheel suspensions are mechanically coupled together via a coupling rod which is connected to the wheel suspensions in an articulated manner.

2. The industrial truck as recited in claim 1, wherein the industrial truck is a forklift truck.

3. The industrial truck as recited in claim 1, wherein the industrial truck further comprises a load bearing device, wherein the plurality of wheels are four wheels, two of the four wheels being load wheels 5 arranged in a vicinity of the load-bearing device, and two wheels being rear wheels 6 arranged further removed from the load-bearing device, and wherein only each of the rear wheels are mounted on the chassis via a respective wheel suspension.

4. The industrial truck as recited in claim 1, wherein the wheel suspensions comprise rigid rockers.

5. The industrial truck as recited in claim 1, wherein the wheel suspensions are mechanically coupled together via a coupling and are configured to fulfill a load-bearing function exclusively via the coupling.

6. The industrial truck as recited in claim 1, wherein the coupling rod is configured so as to be longitudinally adjustable.

7. The industrial truck as recited in claim 1, wherein the coupling rod comprises a hydraulic cylinder.

8. The industrial truck as recited in claim 7, wherein the hydraulic cylinder comprises a pressure accumulator provided thereon.

9. The industrial truck as recited in claim 1, wherein the coupling rod comprises at least one of a damping element and a spring element.

10. The industrial truck as recited in claim 1, wherein the industrial truck is unsprung.

11. The industrial truck as recited in claim 1, wherein the two axes extend in parallel and are arranged so as to be spaced apart from one another.

12. The industrial truck as recited in claim 11, wherein the at least two wheels of the plurality of wheels mounted on the chassis via a respective wheel suspension have a spacing, and wherein the spaced apart arrangement of the axes from one another is smaller than the spacing.

13. The industrial truck as recited in claim 1, wherein the plurality of wheels are configured so as to be pivotable in any direction.

14. A wheel suspension mounted on a chassis around two axes so as to be tiltable as recited in claim 1.

* * * * *